United States Patent [19]

Putt

[11] Patent Number: 4,493,742
[45] Date of Patent: Jan. 15, 1985

[54] METHOD FOR ADJUSTING A VACUUM BRAKE BOOSTER OUTPUT MEMBER RELATIVE TO A MASTER CYLINDER PISTON

[75] Inventor: James B. Putt, Granger, Ind.

[73] Assignee: The Bendix Corporation, Southfield, Mich.

[21] Appl. No.: 592,652

[22] Filed: Mar. 23, 1984

[51] Int. Cl.³ .............................................. B32B 7/04
[52] U.S. Cl. ...................................... 156/91; 60/533; 92/168; 156/293; 156/295
[58] Field of Search ................ 60/533, 547.3; 92/168; 156/91, 293, 294, 295; 403/34, 35

[56] References Cited

U.S. PATENT DOCUMENTS

| | | | |
|---|---|---|---|
| 3,724,211 | 4/1973 | Julow | 60/533 |
| 3,800,674 | 4/1974 | Sember et al. | 60/533 X |
| 3,964,948 | 6/1976 | Busse | 156/91 |
| 4,005,639 | 2/1977 | Welsh | 60/533 X |
| 4,224,971 | 9/1980 | Müller et al. | 156/91 X |
| 4,281,943 | 8/1981 | Viennot | 156/293 X |
| 4,353,209 | 10/1982 | Putt | 60/547.3 |
| 4,377,105 | 3/1983 | Fecher | 60/547.3 X |
| 4,385,547 | 5/1983 | Brown | 60/547.3 X |
| 4,452,456 | 6/1984 | Kochenar | 156/295 X |
| 4,453,301 | 6/1984 | Mort et al. | 156/91 X |

*Primary Examiner*—Robert Dawson
*Attorney, Agent, or Firm*—Paul David Schoenle; Ken C. Decker

[57] ABSTRACT

A vacuum brake booster is coupled to a master cylinder at the same time that an output member for the vacuum brake booster is adjusted relative to a piston for the master cylinder. The adjustment is carried out by a plunger adapted to activate a bonding material for bonding the plunger to the output member.

7 Claims, 2 Drawing Figures

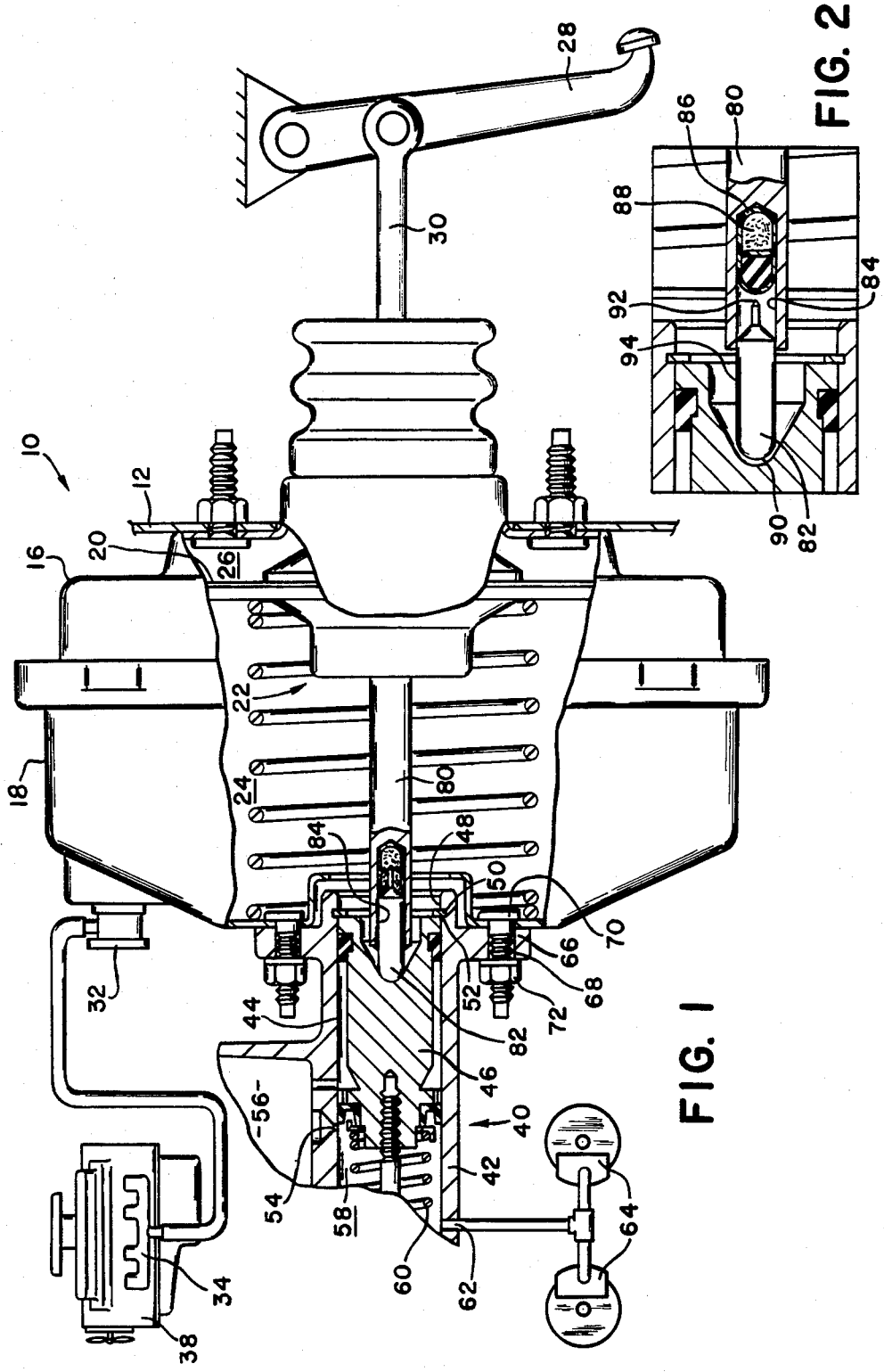

METHOD FOR ADJUSTING A VACUUM BRAKE BOOSTER OUTPUT MEMBER RELATIVE TO A MASTER CYLINDER PISTON

The present invention covers a method to compensate for differences in spacing between an output member of a vacuum brake booster and a piston of a master cylinder.

Heretofore, an output rod of a vacuum brake booster has been provided with a threaded end section to threadably receive a screw. The screw was rotated on the threaded end section before the vacuum brake booster was coupled to the master cylinder so that the screw would contact the piston without moving the latter when the vacuum brake booster was coupled to the master cylinder. As a result, the vacuum brake booster was subjected to a calibration step requiring adjustment of the screw before the master cylinder could be coupled thereto. Such a vacuum brake booster and master cylinder have been illustrated in U.S. Pat. No. 3,724,211 (Julow), issued Apr. 3, 1973.

The present invention covers a method for adjusting a vacuum brake booster output member relative to a master cylinder piston member comprising the steps of providing a plunger disposed between the members, the plunger cooperating with one of the members to define a cavity, disposing a bonding material in the cavity before the master cylinder is coupled to the vacuum brake booster, the plunger substantially defining a passage leading to the bonding material, disposing the members adjacent each other to adjust the position of the plunger in the cavity and communicate an excess amount of bonding material outwardly of the cavity via the passage, and holding the members in a desired adjusted position until the bonding material sets and fixes the plunger to the one member in its adjusted position so that the plunger also engages the other member to form a rigid link between the members.

In the accompanying drawings,

FIG. 1 shows a vacuum brake booster coupled to a master cylinder, and;

FIG. 2 shows an output member of the vacuum brake booster immediately before adjustment relative to a plunger.

A vacuum brake booster 10 is secured to a vehicle firewall 12 by means of bolts 14. The vacuum brake booster includes a rear shell 16 engaging the firewall and a front shell 18 secured to the rear shell 16 at its outer periphery. The front and rear shells support a flexible diaphragm 20 cooperating with a valve assembly 22 to separate a front chamber 24 from a rear chamber 26. A brake pedal 28 is connected with an input member 30 to control operation of the valve assembly 22. In a conventional manner the front shell 18 carries a fitting 32 to communicate the front chamber 24 with a vacuum source 34, such as an intake manifold for a vehicle engine 38.

A master cylinder 40 includes a housing 42 with a bore 44 movably receiving at least one piston 46 at an open end 48 of the bore 44. A snap ring 50 is received in a groove 52 in the bore 44 to define a rest position for the one piston 46. In the rest position, the one piston 46 is adjacent a port 54 communicating fluid from a reservoir 56 to a pressure chamber 58 on one side of the one piston 46. A spring 60 within the pressure chamber 58 biases the one piston 46 to its rest position abutting the snap ring 50. The master cylinder operates in a conventional manner so that the one piston 46 is moved to contract the spring 60 and close port 54 whereby fluid pressure is developed in the pressure chamber 58 and communicated via outlet 62 to a brake assembly 64.

In order to couple the master cylinder 40 to the vacuum brake booster 10, the housing 42 forms flanges 66 with openings 68 for receiving bolts 70. The bolts cooperate with nuts 72 to secure the master cylinder 40 to the vacuum brake booster 10. When the master cylinder 40 is coupled to the vacuum brake booster 10 an output member 80 and plunger 82 are disposed adjacent the one piston 46 such that the one plunger 82 contacts the one piston 46 without moving the latter away from its rest position. The output member 80 defines an opening 84 receiving the plunger 82.

Turning to FIG. 2, the opening receives a capsule 86 with bonding material 88 carried therein. The bonding material 88 may be any suitable glue-like substance or a two part bonding mixture of epoxy. The plunger 82 is formed with a rounded end 90 engageable with the one piston 46 and a point or sharp edge 92 opposite to the rounded end. The outer surface 94 of the plunger 82 is smaller in diameter than the wall of opening 84 to form a small clearance therebetween. With the plunger 82 in the opening 84 and spaced from the capsule 86, the master cylinder 40 is coupled to the vacuum brake booster 10 via bolts 70. The one piston 46 engages the plunger round end 90 to move the plunger further into the opening 84. The plunger point 92 engages the capsule 86 to rupture the same and release the bonding material. As the plunger 82 is moved further into the opening 84 excess bonding material 88 is communicated around the outer surface of the plunger into the small clearance with the wall of opening 84. With the vacuum brake booster tightly coupled to the master cylinder, the plunger 82 will be moved to a stationary position in the opening 84 with excess bonding material surrounding the plunger 82. After a short time span, the bonding material will harden to form a rigid link between the output member 80 and the one piston 46 via the plunger being bonded to the output member. In this bonded position, the plunger contacts the one piston while retaining the latter in abutment with the snap ring 50.

In addition, the glue-like substance within the capsule 86 can be either a two part mixture or an anaerobic type material such as "Loctite", which hardens in the absence of air. With "Loctite", a single cavity is provided in the capsule, so that upon rupture of the capsule, trapped air therein will escape and the "Loctite" in the capsule will harden as a result of the absence of air.

I claim:

1. A method for adjusting a vacuum brake booster output member relatve to a master cylinder piston member comprising the steps of providing a plunger disposed between the members, the plunger cooperating with one of the members to define a cavity, disposing a bonding material in the cavity before the master cylinder is coupled to the vacuum brake booster, the plunger substantially defining a passage leading to the bonding material, disposing the members adjacent each other to adjust the position of the plunger in the cavity and communicate an excess amount of bonding material outwardly of the cavity via the passage, and holding the members in a desired adjusted position until the bonding material sets and fixes the plunger to the one member in its adjusted position so that the plunger also engages the other member to form a rigid link between the members.

2. The method of claim 1 in which the bonding material is carried within a capsule and the capsule is disposed in the cavity before the plunger is disposed in the cavity, providing a point on the plunger to rupture the capsule when the plunger is disposed in the cavity so that excess bonding material will escape from the ruptured capsule and come in contact with the one member and the plunger.

3. The method of claim 1 in which the plunger defines a clearance with the wall of the cavity to form the passage and the excess bonding material is communicated to the clearance to fix the plunger to the wall of the cavity.

4. The method of claim 1 in which the bonding material is communicated through the passage substantially at the same time the vacuum brake booster is coupled to the master cylinder.

5. A method for adjusting a vacuum brake booster output member relative to a master cylinder piston member comprising the steps of positioning a plunger between the members, positioning a bonding material between the plunger and one of the members, and coupling the vacuum brake booster to the master cylinder to simultaneously accommodate any spacing between the plunger and the one member by filling the spacing with bonding material, and retaining the vacuum brake booster coupling to the master cylinder until the bonding material hardens to establish a rigid link between the members.

6. The method of claim 5 in which the bonding material is disposed in a capsule and the plunger ruptures the capsule at the same time the vacuum brake booster is coupled to the master cylionder.

7. The method of claim 5 in which the volume of bonding material disposed between the one member and the plunger is greater than the volume for the spacing so that excess bonding material is communicated around the plunger during coupling of the vacuum brake booster to the master cylinder.

* * * * *